United States Patent [19]

Meier

[11] 3,899,255

[45] Aug. 12, 1975

[54] MEASURING DEVICE

[75] Inventor: Johann Meier, Brione sopra Minusio, Switzerland

[73] Assignee: Premisure AG, Instrumente fur Prazisions-Messung, Solothurn, Switzerland

[22] Filed: May 18, 1973

[21] Appl. No.: 361,587

[52] U.S. Cl............ 356/169; 33/125 A; 33/125 C; 250/231 R; 250/237 G
[51] Int. Cl. .......................................... G01b 11/02
[58] Field of Search .. 33/1 L, 125 R, 125 C, 125 A, 33/166; 250/237 G, 231 R; 356/169, 172

[56] References Cited
UNITED STATES PATENTS

| | | | |
|---|---|---|---|
| 3,196,546 | 7/1965 | Himmelsbach et al. | 33/166 |
| 3,453,051 | 7/1969 | Togino | 250/231 R |
| 3,579,836 | 5/1971 | Kraus | 33/125 C |
| 3,816,002 | 6/1974 | Wieg | 33/125 C |
| 3,816,003 | 6/1974 | Litke | 33/125 C |

Primary Examiner—Richard E. Aegerter
Assistant Examiner—John W. Shepperd
Attorney, Agent, or Firm—Oblon, Fisher, Spivak, McClelland & Maier

[57] ABSTRACT

A measuring device having a scale which is movable along a straight line characterized by the movable scale being disposed within a housing and connected through a carrier part fixed on one end of the scale to a sliding part disposed in parallel relation with the scale and movable therewith along a path parallel to the path of movement of the scale, the sliding part being surrounded by a seal carried by the housing outside the sliding area of the carrier part and a point of applying a stress to the sliding part, the latter being a member projecting from the housing and connected to the sliding part for effecting movement of the sliding part from outside the housing, whereby a measuring device of very short length relative to the length of the scale is provided which is sealed in a substantially perfect manner against dampness and dirt.

7 Claims, 3 Drawing Figures

3,899,255

3,899,255

MEASURING DEVICE

BACKGROUND OF THE INVENTION

The present invention relates to a measuring device with a scale which can be moved along a straight line.

SUMMARY OF THE INVENTION

The purpose of the invention is to obtain a measuring device, provided with a scale which is movable in its longitudinal direction, with which, in spite of a very short method of construction, the inside of the housing can be sealed in a perfect manner against dampness and dirt.

The measuring device in accordance with the invention is characterised in that the scale arranged inside a housing of the device is connected by means of a carrier part, which engages on one end of the scale, to a sliding part which runs parallel to the scale and close thereto, whereby the sliding part is surrounded outside the sliding areas of the carrier part and of the point of application of stress, located on the sliding part for a force serving to displace the sliding part, on the outlet point of the housing, by a seal which is secured in the housing and extends along its periphery, which seal is impermeable to dust and moisture.

In order to move the scale accurately it is convenient if the sliding part is guided in the housing so that it can slide in its longitudinal direction, whereby it is advantageous if the sliding part is constructed as a tube which is movably arranged on a guide bar which is fixed in the housing and which extends parallel to the scale.

BRIEF DESCRIPTION OF THE DRAWINGS

In the following, the invention is explained in greater detail by way of example on the basis of the accompanying drawing, wherein like reference numerals designate like or corresponding parts throughout the several figures and in which.

DETAILED DESCRIPTION OF A PREFERRED EMBODIMENT

Figure 1:
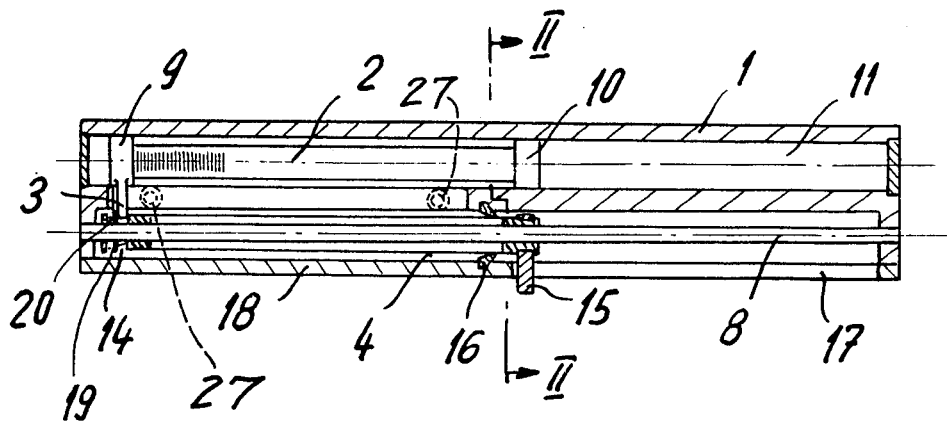
FIG. 1 shows a longitudinal section through an embodiment of a measuring device in accordance with the invention.

As is apparent from the drawing, a scale 2 which is slidably arranged inside a housing 1 is connected in a U-shaped manner, by means of a carrier part 3 which engages on one end of the scale, to a sliding part 4 which extends parallel to and in the vicinity of the scale 2.

Figure 2:
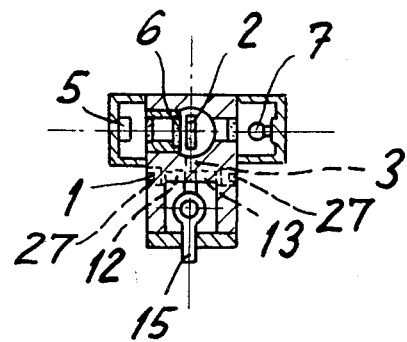
FIG. 2 shows a section along line II-II in FIG. 1.
Figure 3:
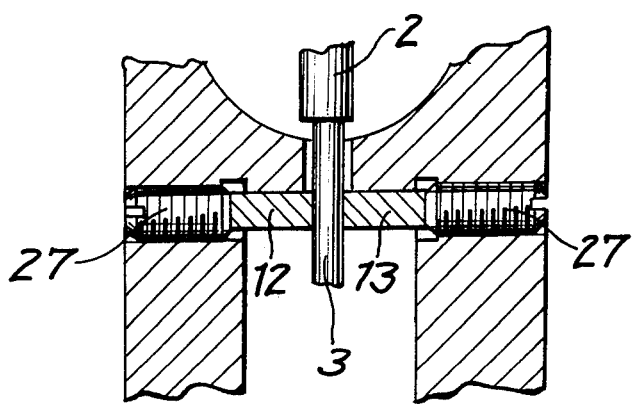
FIG. 3 is an enlarged sectional view, similar to FIG. 2, illustrating the adjustable securing of a pair of guide strips to the housing of the measuring device of this invention through a set screw arrangement.

In the embodiment shown, the scale 2 is constructed as a screen which co-operates with a counter-screen 6 to obtain an optical scanning by means of a photo-electric element 5, whereby, as is apparent from FIG. 2, a light 7 is arranged on the side of the scale 2 opposed to the photo-electric element 5. The scale 2 can of course also consist of a glass measure which can be read by means of a magnifying optical system, or of a coated, electrical winding which co-operates with a second stationary winding in order to produce electrical impulses.

In order to prevent transmission errors, the sliding part 4 is guided so that it moves in its longitudinal direction in the housing 1 and indeed in order to make manufacture and fitting as simple as possible, the sliding part 4 is constructed as a tube which is arranged so that it is slidable in its longitudinal direction on a guide bar 8 which is fixed in the housing 1 and which extends parallel to the scale 2.

The scale 2 is in turn provided at each end with a cylindrical guide part 9 and 10 respectively, the guide parts being movably guided, without clearance, inside a bore 11 located in the housing 1.

The carrier part 3 is firmly connected to one guide part 9 and is guided, without clearance, between two guide strips 12 and 13 which are adjustable perpendicularly to its direction of movement through a plurality of set screws 27 and which are secured on the housing 1. It is possible with the aid of these guide strips 12 and 13, which are secured on the housing 1, to turn the scale 2 absolutely accurately into the correct plane and to guide it without play in this plane.

The carrier part 3 is constructed as a bolt which engages in an annular groove 14 provided on the end of the sliding part 4 so that the tolerance for the interval between the bore 11 and the longitudinal axis of the guide bar 8 can be kept at such a value that no difficulties occur during manufacture.

In order to ensure that the carrier part 3 engages, without play, in the annular groove, one the of said groove is formed by an annulus 20 which is under the pressure of a spring 19.

In order to seal the inside of the housing so that no dust or moisture can penetrate, the sliding part 4 is surrounded, outside the sliding regions of the carrier part 3 and of the point 15, located on the sliding part 4, on which point 15 a force is applied which moves the sliding part 4, at the outlet point of the housing, by a rubber-elastic lip-seal 16 which is secured in the housing 1 and which extends along its periphery, which lip-seal is impermeable to dust and moisture.

The part 15 where force is applied is fitted on the end of the tubular sliding part 4 which projects out of the housing 1, the part 15 serving for instance as a connection to a machine and being guided in a slit 17 in the cover lid 18 in order to prevent rotation of the sliding part 4.

It is possible in the manner described to seal the inside of the measuring device so that no dust or moisture can penetrate, without the device taking up about three times the length of the scale 2 when the latter is in one fully extended end position, this being necessary in previously known designs. The device constructed in accordance with the present invention only takes up approximately twice the length of the scale 2 when the scale is in one fully extended end position and is therefore considerably shorter than the previously known designs.

Obviously, numerous modifications and variations of the present invention are possible in light of the foregoing. It is therefore to be understood that within the scope of the appended claims the invention may be practiced otherwise than as specifically described herein.

What is claimed as new and desired to be secured by Letters Patent of the United States is:

1. A measuring device comprising:
   a housing;

an elongate scale slidable within said housing for movement along a longitudinal path between first and second end positions;

a sliding part disposed in parallel relation with and closely adjacent to said scale, being slidable along a path parallel to said longitudinal sliding path of said scale between corresponding first and second end positions;

means disposed within said housing connecting said scale and said sliding part at respective one ends thereof for effecting simultaneous sliding movements of said scale and said sliding part in the same direction along said longitudinal sliding paths;

a seal secured within said housing and sealingly engaging the periphery of said sliding part while permitting sliding movement of said sliding part through said seal, said seal engaging said sliding part adjacent the other end thereof when said sliding part is disposed in said first end position;

a force receiving member projecting from said housing and being connected to said sliding part at the other end thereof for effecting sliding movement thereof from outside the housing; and said sliding part in said first end position of its sliding path being substantially disposed within said housing, and in the course of sliding toward said second end position of its sliding path upon application of a force to said force receiving member being progressively projected through said seal from the confines of said housing.

2. A measuring device as set forth in claim 1, further comprising guide means in said housing for guiding said sliding part within said longitudinal sliding path thereof.

3. A measuring device as set forth in claim 2, wherein said sliding part is tubular in configuration and said guide means therefor is a guide bar upon which said tubular sliding part is movably disposed.

4. A measuring device as set forth in claim 1, further comprising guide means adjustably secured within said housing for guiding said means connecting said scale and said sliding part for movement along a longitudinal path parallel to the longitudinal sliding path of said scale.

5. A measuring device as set forth in claim 1, wherein said scale is constructed as a screen and further comprising a counter-screen for providing optical scanning.

6. A measuring device as set forth in claim 1, further comprising cylindrical guide elements secured to each end of said scale and a bore in said housing in which said cylindrical guide elements are slidably disposed without clearance.

7. A measuring device as set forth in claim 1, wherein said seal is formed by a lip seal.

* * * * *